(12) United States Patent
Kobayashi

(10) Patent No.: US 9,500,934 B2
(45) Date of Patent: Nov. 22, 2016

(54) LIGHT QUANTITY CONTROL APPARATUS, OPTICAL APPARATUS AND IMAGE PICKUP APPARATUS

(71) Applicant: CANON KABUSHIKI KAISHA, Tokyo (JP)

(72) Inventor: Futoshi Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 14/501,547

(22) Filed: Sep. 30, 2014

(65) Prior Publication Data
US 2015/0098012 A1    Apr. 9, 2015

(30) Foreign Application Priority Data

Oct. 4, 2013   (JP) .................................. 2013-208932

(51) Int. Cl.
| | |
|---|---|
| *G03B 9/06* | (2006.01) |
| *G03B 9/22* | (2006.01) |
| *H04N 5/225* | (2006.01) |
| *G02B 7/08* | (2006.01) |

(52) U.S. Cl.
CPC . *G03B 9/06* (2013.01); *G02B 7/08* (2013.01); *G03B 9/22* (2013.01); *H04N 5/2254* (2013.01)

(58) Field of Classification Search
CPC .................. G03B 9/08–9/54; H04N 5/2254
See application file for complete search history.

(56) References Cited

U.S. PATENT DOCUMENTS

| | | | | |
|---|---|---|---|---|
| 3,955,887 | A * | 5/1976 | Toyama | G03B 19/18 352/141 |
| 7,934,877 | B2 | 5/2011 | Aoshima et al. | |
| 2003/0007802 | A1* | 1/2003 | Noguchi | G03B 9/10 396/493 |
| 2003/0066821 | A1* | 4/2003 | Wybrow | B23K 26/388 219/121.71 |
| 2007/0052808 | A1* | 3/2007 | Schroderus | H04M 1/0264 348/207.99 |
| 2008/0205880 | A1 | 8/2008 | Aoshima et al. | |
| 2009/0021820 | A1* | 1/2009 | Gellrich | G02B 5/005 359/234 |

FOREIGN PATENT DOCUMENTS

| | | |
|---|---|---|
| CN | 101251707 A | 8/2008 |
| JP | 02-153334 A | 6/1990 |

OTHER PUBLICATIONS

Sep. 5, 2016 Chinese Official Action in Chinese Patent Appln. No. 201410509948.X.

* cited by examiner

*Primary Examiner* — Christopher K Peterson
(74) *Attorney, Agent, or Firm* — Fitzpatrick, Cella, Harper & Scinto

(57) ABSTRACT

A light quantity control apparatus includes multiple blade members each including a first curved surface-shaped portion and a hole portion, and a member including multiple protrusion portions each inserted into the hole portion of one of the blade members. The member includes a second curved surface-shaped portion shaped along the first curved surface-shaped portion of each of the blade members. The protrusion portions extend from the second curved surface-shaped portion and extend in parallel with each other.

19 Claims, 7 Drawing Sheets

LIGHT QUANTITY CONTROL APPARATUS, OPTICAL APPARATUS AND IMAGE PICKUP APPARATUS

BACKGROUND OF THE INVENTION

Field of the Invention

The invention relates to a light quantity control apparatus such as a shutter or an aperture stop used in a camera, and to an optical apparatus and an image pickup apparatus including the light quantity control apparatus.

Description of the Related Art

Japanese Patent Laid-open No. 2-153334 discloses a spherical shutter in which its shutter blade, which is conventionally formed in a planar shape, is spherically formed so as to reduce diameter of a lens barrel and size of a camera body.

However, in the spherical shutter disclosed in Japanese Patent Laid-open No. 2-153334, multiple bosses about which multiple spherical shutter blades rotate extend toward a center of a spherical body formed by the spherical shutter blades. In other words, each of the bosses in Japanese Patent Laid-open No. 2-153334 extends in a normal direction in which a normal to the spherical body formed by the spherical shutter blades extends. Thus, manufacturing of the spherical shutter including such bosses requires a special working process. In particular, when the spherical shutter is formed by plastic molding using a general mold requires a same number of so-called slide molds as that of the bosses, the slide molds being configured to be slidable in directions in which the bosses extend. This requirement results in a complicated mold structure, a high mold cost and an additional mold maintenance process. In addition, using the slide mold forms a mold parting line, and such a parting line may potentially disturb movement of the shutter blades. Moreover, since a portion molded by using the slide mold only has a shape extending in a direction in which the slide mold slides, a portion desired to be molded which extends in an optical axis direction (direction in which a light flux passes through the shutter) cannot be molded, which makes designing of the shutter difficult.

SUMMARY OF THE INVENTION

The invention provides a light quantity control apparatus including multiple blade members each including a first curved surface-shaped portion and a hole portion, and a member including multiple protrusion portions each inserted into the hole portion of each of the blade members. The member includes a second curved surface-shaped portion in contact with the first curved surface-shaped portion of each of the blade members, and the protrusion portions extend from the second curved surface-shaped portion in parallel to each other. manufacturing thereof.

The invention provides as an aspect thereof a light quantity control apparatus including multiple blade members each including a first curved surface-shaped portion and a hole portion, and a member including multiple protrusion portions each inserted into the hole portion of each of the blade members. The member includes a second curved surface-shaped portion in contact with the first curved surface-shaped portion of each of the blade members, and the protrusion portions extend from the second curved surface-shaped portion in parallel to each other.

The invention provides as another aspect thereof an optical apparatus including multiple blade members each including a first curved surface-shaped portion and a hole portion, and a member including multiple protrusion portions each inserted into the hole portion of each of the blade members. The member includes a second curved surface-shaped portion in contact with the first curved surface-shaped portion of each of the blade members, and the protrusion portions extend from the second curved surface-shaped portion in parallel to each other.

The invention provides as yet another aspect thereof an image pickup apparatus including an image sensor, and an optical apparatus. The optical apparatus includes multiple blade members each including a first curved surface-shaped portion and a hole portion, and a member including multiple protrusion portions each inserted into the hole portion of each of the blade members. The member includes a second curved surface-shaped portion in contact with the first curved surface-shaped portion of each of the blade members, and the protrusion portions extend from the second curved surface-shaped portion in parallel to each other.

The invention provides as still another aspect thereof a light quantity control apparatus including multiple blade members each including a first curved surface-shaped portion and a hole portion, and a member including multiple protrusion portions each inserted into the hole portion of each of the blade members. The member includes a second curved surface-shaped portion in contact with the first curved surface-shaped portion of each of the blade members, and the protrusion portions extend from the second curved surface-shaped portion in a direction different from a normal direction in which a normal to the second curved surface-shaped portion extends.

The invention provides as yet still another aspect thereof an optical apparatus including multiple blade members each including a first curved surface-shaped portion and a hole portion, and a member including multiple protrusion portions each inserted into the hole portion of each of the blade members. The member includes a second curved surface-shaped portion in contact with the first curved surface-shaped portion of each of the blade members, and the protrusion portions extend from the second curved surface-shaped portion in a direction different from a normal direction in which a normal to the second curved surface-shaped portion extends.

The invention provides as another aspect thereof an image pickup apparatus including an image sensor and an optical apparatus. The optical apparatus includes multiple blade members each including a first curved surface-shaped portion and a hole portion, and a member including multiple protrusion portions each inserted into the hole portion of each of the blade members. The member includes a second curved surface-shaped portion in contact with the first curved surface-shaped portion of each of the blade members, and the protrusion portions extend from the second curved surface-shaped portion in a direction different from a normal direction in which a normal to the second curved surface-shaped portion extends.

Further features and aspects of the invention will become apparent from the following description of exemplary embodiments with reference to the attached drawings.

DESCRIPTION OF THE EMBODIMENTS

Exemplary embodiments of the invention will be described below with reference to the attached drawings.

Figure 1:
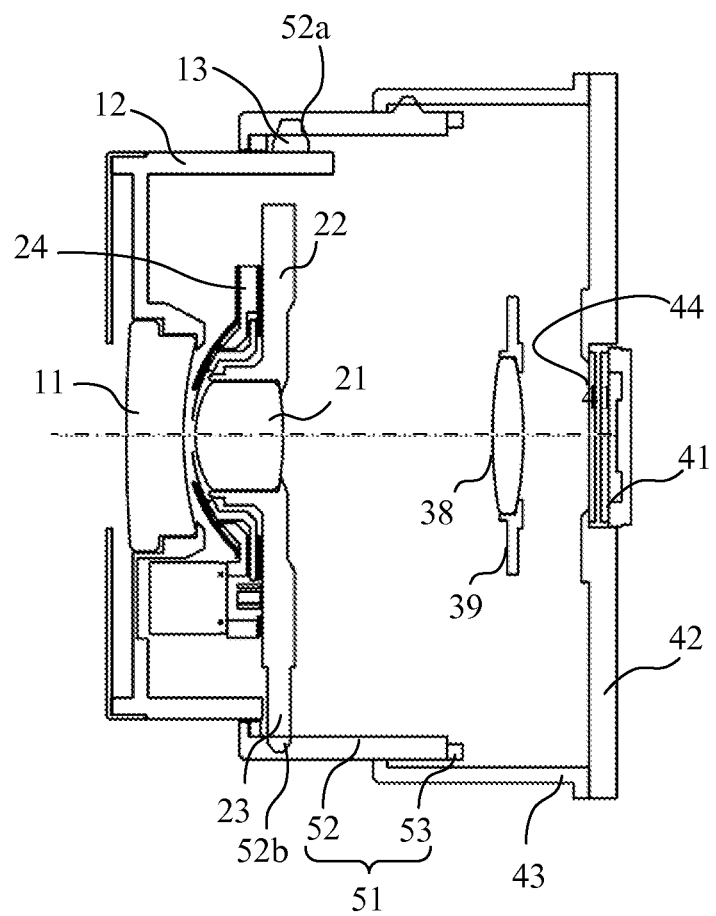
FIG. 1 is a sectional view illustrating an optical apparatus that is an embodiment of the invention; the apparatus is in an image taking state (telephoto state).
Figure 2:
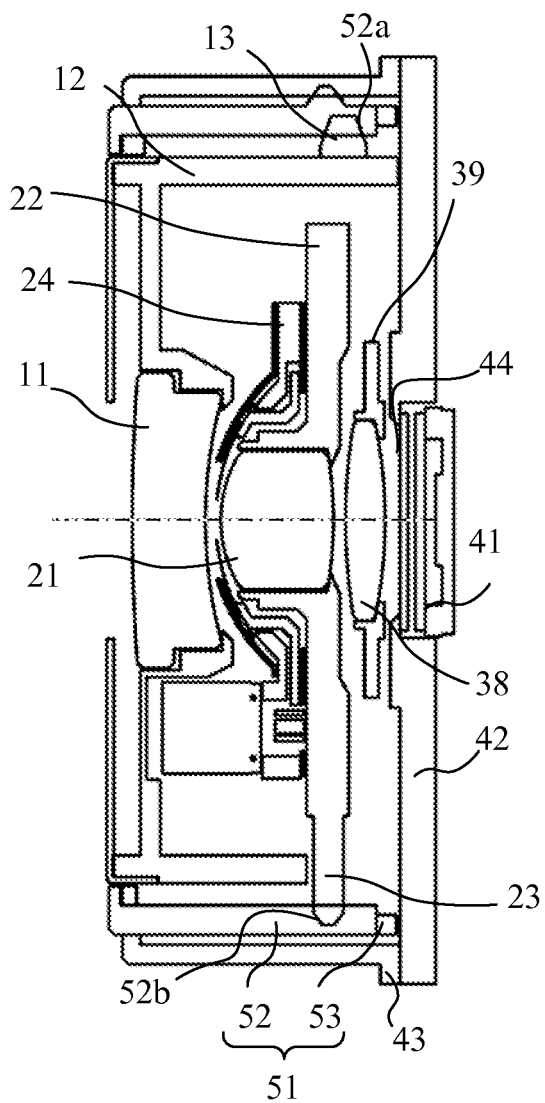
FIG. 2 is a sectional view illustrating the optical apparatus of the embodiment in its retracted state.
Figure 3:
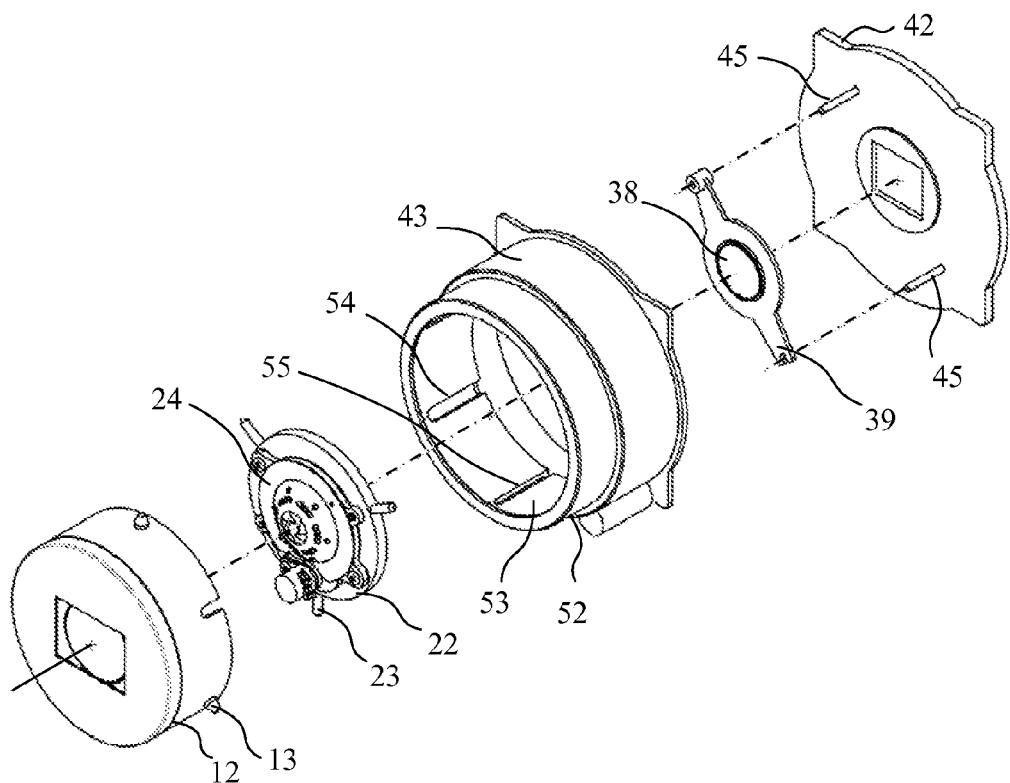
FIG. 3 is an exploded perspective view illustrating the optical apparatus of the embodiment.

FIG. 1 illustrates a section of a lens barrel that is an optical apparatus being in an image taking state (or a telephoto state); the lens barrel includes a light quantity control apparatus that is an embodiment of the invention. FIG. 2 illustrates a section of the lens barrel being in a non-image taking state (or a retracted state). FIG. 3 is an exploded perspective view of the lens barrel.

As illustrated in FIGS. 1 and 2, the lens barrel of this embodiment includes three lens units constituting an image taking lens. The three lens units (which are lens members or optical members)) are, in order from an object side to an image plane side, a first lens unit 11, a second lens unit 21 and a third lens unit 38. The first lens unit 11 is held by a first lens holder 12, the second lens unit 21 is held by a second lens holder 22, and the third lens unit 38 is held by a third lens holder 39. An object image formed by these lens units 11 to 13 is photoelectrically converted by an image sensor 41 provided behind (closer to an image plane than) the third lens unit 38 and is recorded by a camera system (not illustrated). The image sensor 41 is held by an image sensor holder 42. An optical filter 44 held by the image sensor holder 42 is disposed on the object side further (closer to an object) than the image sensor 41.

Next, a detailed description will be made of a configuration of the lens barrel.

A fixed barrel 43 having a cylindrical shape is fixedly held by the image sensor holder 42. An intermediate barrel unit 51 is constituted by an intermediate rotatable barrel 52 having a cylindrical shape and an intermediate linearly movable barrel 53 that engages with an inner circumference of the intermediate rotatable barrel 52. The intermediate rotatable barrel 52 and the intermediate linearly movable barrel 53 engage with each other so as to be relatively rotatable about an optical axis of the lens barrel but so as not to be relatively movable in a direction of the optical axis (that is, a direction in which the light flux passes or a direction opposite thereto; hereinafter referred to as "an optical axis direction"). The intermediate rotatable barrel 52 is provided with three cam followers arranged on its outer circumferential surface at equal intervals about the optical axis. Each of these cam followers engages with each of cams formed on an inner circumferential surface of the fixed barrel 43 and moves in the optical axis direction along a locus of the cam with rotation of the intermediate rotatable barrel 52. The intermediate linearly movable barrel 53 is movable relative to the fixed barrel 43 only in the optical axis direction and is supported such that its rotation about the optical axis is prevented. The intermediate rotatable barrel is rotated about the optical axis by a motor (not illustrated).

The first lens barrel 12 is provided with three cam followers 13 arranged on its outer circumferential surface at equal intervals about the optical axis. Each of the cam followers 13 engages with first lens cams 52a formed on an inner circumferential surface of the intermediate rotatable barrel 52 and with first lens straight groove portions 54 formed in the intermediate linearly movable barrel 53; each first lens straight groove portion 54 extends in the optical axis direction. This configuration enables the first lens barrel 12 to be supported linearly movably in the optical axis direction by the first lens straight groove portions 54 of the intermediate linearly movable barrel 53 and to be moved in the optical axis direction along a cam locus of each first lens cam 52a with the rotation of the intermediate rotatable barrel 52.

The second lens holder 22 is provided with three cam followers 23 arranged on its outer circumferential surface at equal intervals about the optical axis; each cam follower 23 extends from the outer circumferential surface of the second lens holder 22 in a direction orthogonal to the optical axis. Each of the cam followers 23 engages with second lens cams 52b formed on the inner circumferential surface of the intermediate rotatable barrel 52 and with second lens straight groove portions 55 formed in the intermediate linearly movable barrel 53; each second lens straight groove portion 55 extends in the optical axis direction. This configuration enables the second lens holder 22 to be supported movably in the optical axis direction by the second lens straight groove portions 55 of the intermediate linearly movable barrel 53 and to be moved in the optical axis direction along a cam locus of each second lens cam 52b with the rotation of the intermediate rotatable barrel 52.

An aperture stop unit 24 is fixed on a front side portion (object side portion) of the second lens holder 22. The aperture stop unit 24 is driven by an aperture stop motor 31 (shown in FIG. 4) electrically connected to outside of the lens barrel through, for example, a flexible printed board.

The aperture stop unit (light quantity control apparatus) 24 in this embodiment includes multiple stop blades 26 (which are blade members or shielding members) each having a curved surface shape and each being rotatable along a predetermined spherical surface. Specifically, each stop blade 26 in this embodiment has a spherical (curved) surface shape equal to that of an object side surface of the second lens unit 21 and moves along the object side surface. However, stop blades 26 in alternative embodiments are not limited to the above-described one and may have, for example, a spherical surface shape equal to that of an image plane side spherical surface of the first lens unit 11 or a spherical surface shape corresponding to an intermediate spherical shape between the spherical surface shape of the image plane side spherical surface of the first lens unit 11 and that of the object side spherical surface of the second lens unit 21. This configuration enables, in the retracted state illustrated in FIG. 2, the aperture stop unit 24 to be disposed in a space between the two spherical surfaces of the first and second lens units 11 and 21, which shortens a length of the lens barrel in the retracted state. The configuration also enables, in the image taking state illustrated in FIG. 1, shortening a distance between the first and second lens units 11 and 21 as compared to a case where the aperture stop unit includes flat stop blades, which makes it possible to increase an adjustable range of a focal length of the image pickup apparatus. The aperture stop unit 24 will be described in detail later.

The third lens holder 39 engages with two guide bars 45 extending in the optical axis direction and being held by the image sensor holder 42, thereby being supported movably in the optical axis direction while its rotation about the optical axis is prevented. The lens barrel of this embodiment is a zoom lens in which its focal length can be adjusted by the first lens barrel 12 and the second lens holder 22 being moved in the optical axis direction and in which its focus state is adjusted by the third lens holder 39 being moved in the optical axis direction. The third lens holder 39 is moved in the optical axis direction by a focus motor (not illustrated).

The lens barrel thus configured is installed in the image pickup apparatus, and a control unit (controller) provided in the image pickup apparatus performs zoom drive, focus drive and aperture stop drive of the lens barrel. For example, the intermediate rotatable barrel 52 is rotated by the motor (not illustrated) as described above, so that control of the rotation of the motor can set a rotational phase of the intermediate rotatable barrel 52 to a desired one. Thus, this control can set the distance between the first and second lens units 11 and 21 to a desired one, thereby enabling image taking at a focal length desired by a user. In addition, the third lens unit 38 can be moved by the focus motor (not illustrated) so as to form an in-focus object image. Moreover, the aperture stop unit 24 can be driven so as to control quantity of light entering the image sensor 41, thereby forming an object image whose luminance is properly controlled.

When the lens barrel is in the retracted state, not only the third lens holder 39 is moved to a position closest to the image plane (an image pickup surface of the image sensor 41) but also the first lens barrel 12 and the second lens holder 22 are moved to positions closest to each other (that is, to retracted positions illustrated in FIG. 2), thereby making the entire lens barrel compact.

As described above, the lens barrel of this embodiment is configured to extend and retract at two portions in the optical axis direction, which provides different total lengths in the image taking state and in the retracted state.

Figure 4:
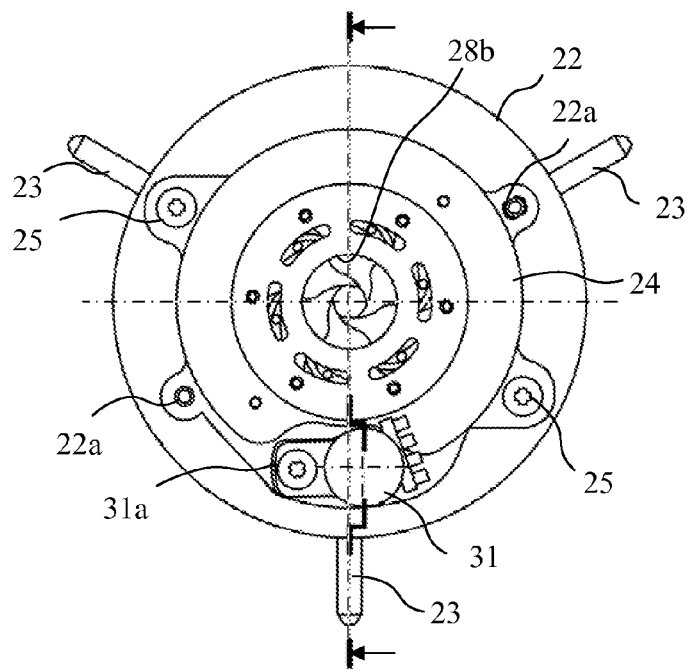
FIG. 4 is a front view illustrating a light quantity control apparatus of the embodiment of the invention is applied.
Figure 5:
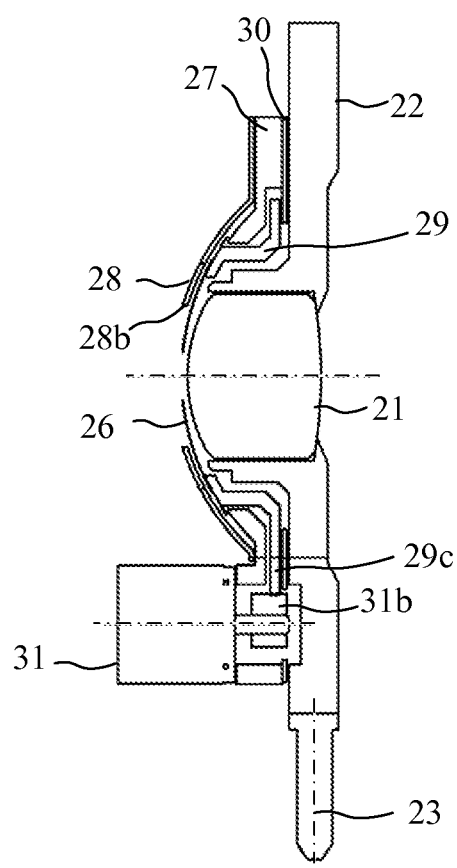
FIG. 5 is a sectional view illustrating the light quantity control apparatus of the embodiment.
Figure 6:
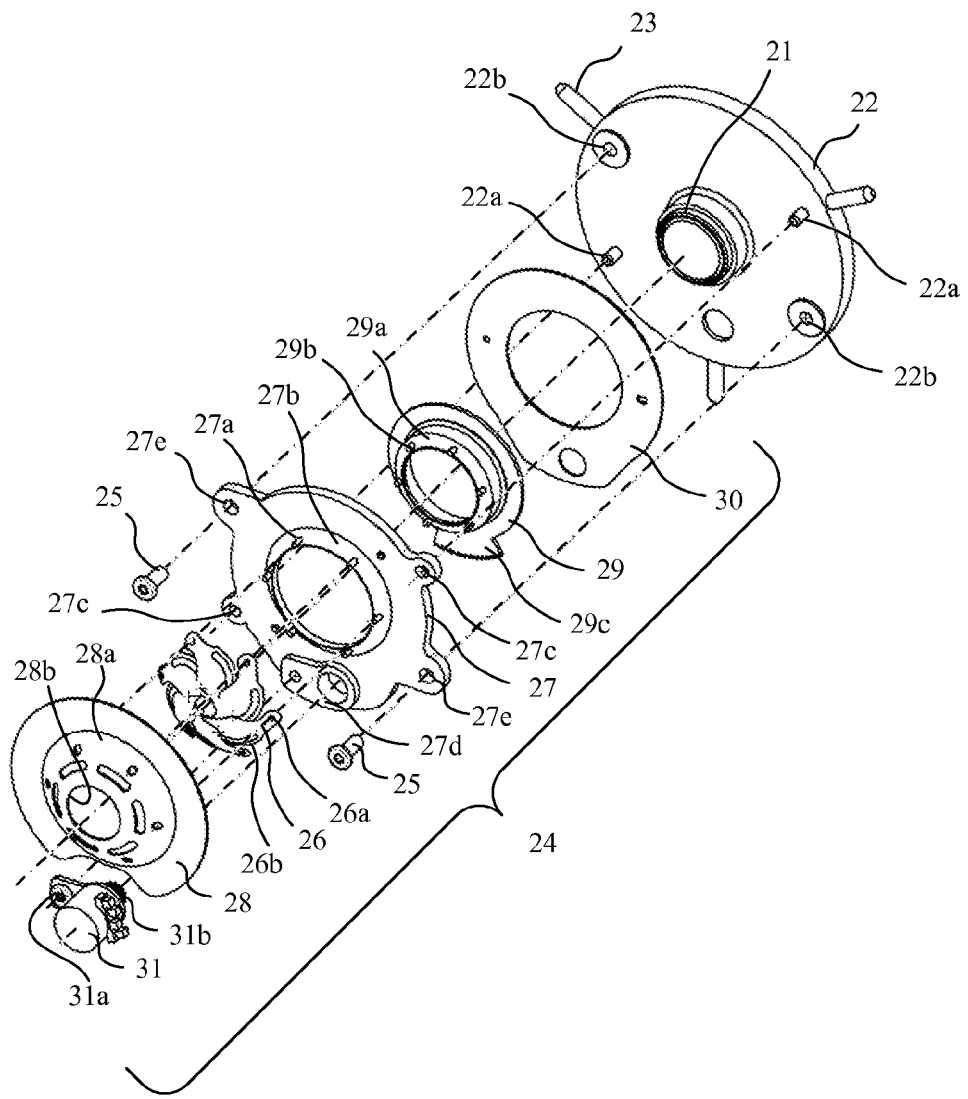
FIG. 6 is an exploded perspective view illustrating the light quantity control apparatus of the embodiment.

Next, detailed description will be made of the aperture stop unit 24 with reference to FIGS. 4, 5 and 6. FIG. 4 is a front view of the second lens holder 22 provided with the aperture stop unit 24 fastened thereto by screws 25. FIG. 5 is a sectional view of the second lens holder 22 and the aperture stop unit 24 in FIG. 4. FIG. 6 is an exploded perspective view of the second lens holder 22 and the aperture stop unit 24.

The stop blades (six stop blades) 26 are each made of a sheet material having a curved surface shape (that is, having a first curved surface-shaped portion). The six stop blades 26 are arranged at equal intervals in a circumferential direction about the optical axis and together form an aperture. The stop blades 26 each includes a circular rotation hole (hole portion) 26a serving as a rotation center thereof. An aperture stop base plate (base member) 27 serving as a base on which the stop blades 26 are arranged is provided closer to the image plane than the stop blades 26. The aperture stop base plate 27 includes a curved surface portion (second curved surface-shaped portion) 27b on which the stop blades 26 are mounted, that is, which is in contact with the stop blades 26. The curved surface portion 27b has a curved surface shape approximate to (that is, along) a curved surface shape of each stop blade 26. Specifically, the curved surface portion 27b has a radius slightly smaller than that of the curved surface shape of each stop blade 26 and has its center on the optical axis. The curved surface portion 27b is provided with six rotation bosses (protrusion portions) 27a each engaging with the rotation hole 26a of each stop blade 26 and each extending in the optical axis direction (that is, in a direction parallel to the optical axis). The six rotation bosses 27a are spaced at equal intervals in the circumferential direction about the optical axis so as to respectively correspond to the six stop blades 26. Specifically, the curved surface portion 27b is provided with the multiple rotation bosses 27a extending in the same direction. More specifically, the rotation bosses 27a each extend in a direction different from a normal direction in which a normal to a curved surface (spherical surface) of the curved surface portion 27b extends.

Figure 7:
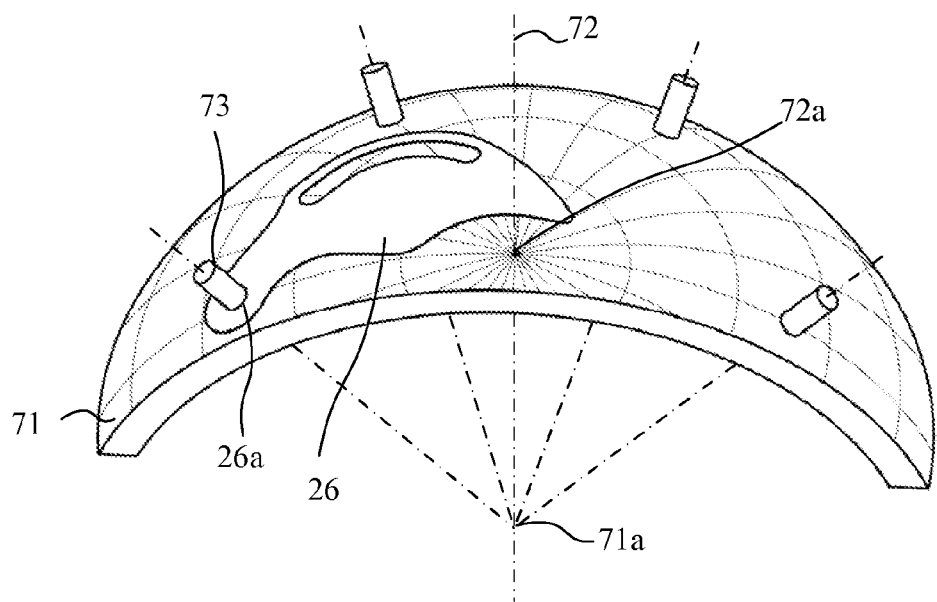
FIG. 7 schematically illustrates a light quantity control apparatus including a spherical surface-shape blade member.

Next, description will be made of movement of each curved surface-shaped stop blade 26 on the curved surface portion 27b with reference to FIG. 7. FIG. 7 conceptually illustrates a relation between the curved surface-shaped stop blade 26 and the curved surface portion 27b. In FIG. 7, reference numeral 71 denotes a curved surface (spherical surface) whose center and radius are same as those of the curved surface portion 27b. The stop blade 26 is moved on the spherical surface 71 along the spherical shape of the spherical surface 71. The movement of the stop blade 26 requires a gap between the stop blade 26 and the spherical surface 71. Thus, the radius of the spherical surface (that is, the radius of the curved surface portion 27b) is smaller than the radius of the curved surface of the stop blade 26 by, for example, approximately 0.2 mm to form the gap.

Reference numeral 72 denotes the optical axis passing through a center 72a of the aperture formed by the stop blades 26 and through a center 71a of the spherical surface 71 (that is, of the curved surface of the curved surface portion 27b). Reference numeral 73 denotes each imaginary boss having a central axis intersecting with the optical axis at a predetermined angle. The central axis of the imaginary boss 73 extends in a normal direction in which a normal to the spherical surface 71 extends. In other words, the imaginary boss 73 extends in the normal direction of the spherical surface 71. Engagement of the imaginary boss 73 with the rotation hole 26a of the stop blade 26 enables the stop blade 26 to rotate about the imaginary boss 73 along the spherical surface 71. In this embodiment, six imaginary bosses 73, whose number is same as that of the stop blades 26, are provided. The central axes of the six imaginary bosses 73 intersect with one another at one point on the optical axis 72 and have a same predetermined angle with respect to the optical axis 72. With this configuration, each stop blades 26 is supported rotatable about the imaginary boss 73 along the spherical surface 71. However, this configuration in which the imaginary boss 73 extends in the normal direction of the spherical surface 71 like a rotation boss disclosed in Japanese Patent Laid-open No. 2-153334 makes manufacturing of the light quantity control apparatus difficult.

For this reason, in this embodiment, the imaginary boss 73 is replaced with the rotation boss 27a described below.

Figure 8:
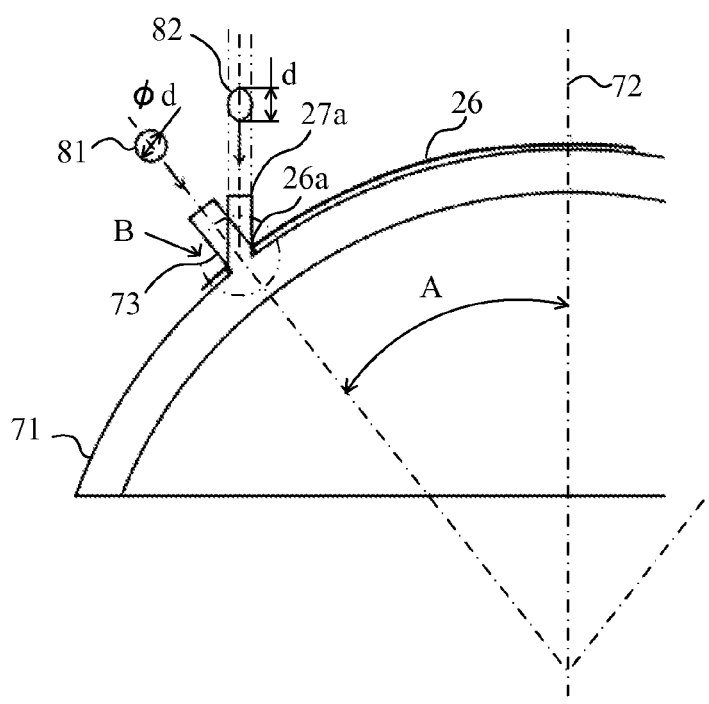
FIG. 8 is an explanatory diagram illustrating a rotation shaft of a blade member of the light quantity control apparatus of the embodiment.

Next, description will be made of a relation between the imaginary boss 73 and the rotation boss 27a in this embodiment with reference to FIG. 8. FIG. 8 is a sectional view of the spherical surface 71, the imaginary boss 73, the rotation boss 27a and the stop blade 26 shown in FIG. 7 in a sectional plane including the central axis of the imaginary boss 73 and the optical axis 72. In FIG. 8, reference numeral 81 denotes a sectional shape (projected shape) of a portion where the imaginary boss 73 and the rotation hole 26a of the stop blade 26 engage with each other when viewed from a direction in which the central axis of the imaginary boss 73 extends.

The projected shape 81 is a circular shape whose axis and diameter are the same as those of the rotation hole 26a. Being the same includes not only being completely the same, but also being substantially the same with any manufacturing error, any gap for movement or the like. Moreover, the circular shape includes not only a perfectly circular shape but also a substantially circular shape because of any manufacturing error or the like. Reference numeral 82 denotes a sectional shape (projected shape) of a portion where the rotation boss 27a in this embodiment and the rotation hole 26a of the stop blade 26 engage with each other when viewed in a direction in which a central axis of the rotation boss 27a extends (that is, in the optical axis direction).

In other words, the projected shape 82 is a sectional shape of the rotation boss 27a in a direction orthogonal to the optical axis. The projected shape 82 has an elliptical shape unlike the projected shape 81; a major axis of the elliptical shape has a length equal to the diameter d of the projected shape 81 (that is, equal to the diameter of the rotation hole 26a).

The elliptical shape includes not only a perfectly elliptical shape but also a substantially elliptical shape because of any manufacturing error or the like. The minor axis of the projected shape 82 has, when an angle between the optical axis 72 and the central axis of the imaginary boss 73 (in other words, a central axis passing through a center of the rotation hole 26a and extending in the normal direction of the spherical surface 71, that is, of the curved surface portion 27b) is represented by A, a length obtained by multiplying the length d of the major axis by cos A. However, in reality, it is necessary to reduce the length of the major axis of the rotation boss 27a in consideration of looseness for movement and a thickness of the stop blade 26.

Figure 9:
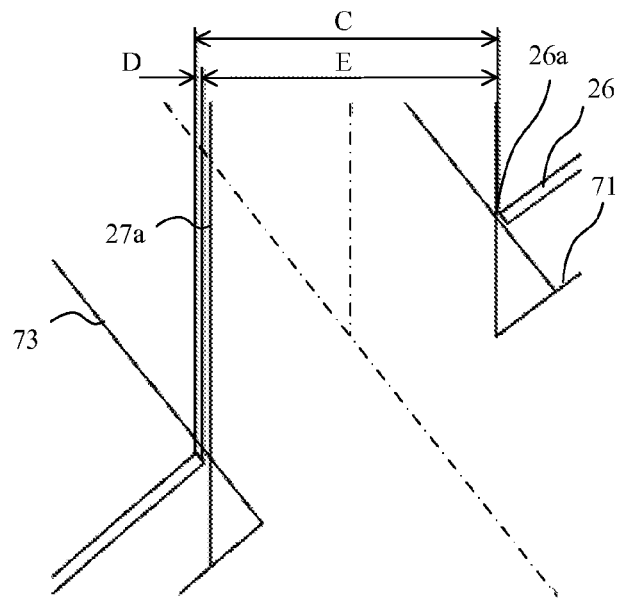
FIG. 9 is an enlarged view illustrating the blade member illustrated in FIG. 8 engaged with the boss.

FIG. 9 is an enlarged view of a part B in FIG. 8. A length C denotes the length of the minor axis of the projected shape 82 calculated from the diameter of the rotation hole 26a of the stop blade 26, that is, the length obtained by multiplying the above-mentioned length of the major axis of the projected shape 82 by cos A. However, since the actual stop blade 26 has a thickness, in consideration of a length D due to the thickness of the stop blade 26, the length of the minor axis of the projected shape 82 is set less than a length E. The length E is a length obtained by subtracting the length D from the length C. The length D is a length obtained by multiplying the thickness t of the stop blade 26 in its normal direction by sin A. A length smaller than a length obtained by subtracting the looseness for movement from the length E is an actual length of the minor axis of the projected shape 82. Thus, the projected shape 82 of the rotation boss 27a is a shape corresponding to a projected shape of the rotation hole 26a of the stop blade 26 in the optical axis direction (that is, a shape having a smaller width in a direction of the minor axis than that of the projected shape of the rotation hole 26a).

As described above, the rotation boss 27a in this embodiment has an elliptic cylindrical shape extending in the optical axis direction. The rotation boss 27a whose projected shape in the optical axis direction is an elliptical shape has, when viewed in the direction in which the central axis of the imaginary boss 73 extends, a circular shape. The rotation boss 27a with such a shape provides a same engagement state with the stop blade 26 as that provided by the imaginary boss 73.

As illustrated in FIGS. 5 and 6, an aperture stop cover 28 having a curved surface shape approximate to the curved surface shapes of the stop blades 26 is disposed closer to the object than the stop blades 26. Specifically, the aperture stop cover 28 includes a curved surface portion 28a having a radius slightly larger than that of the curved surface shape of the stop blades 26. The aperture stop cover 28 is attached to the aperture stop base plate 27 so as to cover over the stop blades 26 and such that a center of the curved surface portion 28a coincides with that of the curved surface portion 27b of the aperture stop base plate 27.

This configuration forms a movement space for the stop blades 26 between two curved surfaces, that is, the curved surface portion 27b and the curved surface portion 28a. A difference between the radius of the curved surface portion 28a and that of the curved surface shape of the stop blade 26 provides a gap therebetween for movement of the stop blade 26. For this reason, the radius of the curved surface portion 28a is set larger than that of the curved surface shape of the stop blade 26 by, for example, approximately 0.2 mm. The aperture stop cover 28 is provided with a circular aperture 28b as a fully-opened aperture for the image taking lens.

Reference numeral 29 denotes a driving ring which is supported rotatably about the optical axis relative to the aperture stop base plate 27 and that engages with the stop blades 26 as described later; rotation of the driving ring varies the diameter of the aperture. The driving ring 29 includes a curved surface portion 29a which supports the stop blades 26 and which has a same center on the optical axis as that of the curved surface portion 27b of the aperture stop base plate 27. The curved surface portion 29a has a radius which is smaller than that of the curved surface shape of the stop blade 26 and which is equal to that of the curved surface portion 27b. The curved surface portion 29a is provided with six driving pins 29b (protrusion portions or bosses) arranged at equal intervals in the circumferential direction about the optical axis and extending in the optical axis direction.

The six driving pins 29b each have a shape same as or similar to that of the rotation boss 27a. The stop blades 26 are each provided with a cam hole (hole portion) 26b with which each driving pin 29b engages. The cam hole 26b in this embodiment is an elongate hole having a fixed width equal to the diameter of the rotation hole 26a. Since the driving pins 29b are arranged at equal intervals circumferentially about the optical axis, the six stop blades 26 are arranged point-symmetrically with respect to the optical axis. The six stop blades 26 are arranged, when viewed from the object side, such that an overlapping arrangement in which one stop blade overlaps over part of its previous stop blade in a clockwise direction about the optical axis is repeated. The driving ring 29 is held by a driving ring cover 30 disposed closer to the image plane than the driving ring 29 and attached to the aperture stop base plate 27, with a predetermined looseness in the optical axis direction.

The driving ring 29 is provided with a gear portion 29c centering about the optical axis. The aperture stop motor 31 is a stepping motor configured to rotate its output shaft by a predetermined angle in response to an input pulse. The aperture stop motor 31 is fixed on an attachment face 27d of the aperture stop base plate 27 by a screw 31a. The output shaft of the aperture stop motor 31, which extends parallel to the optical axis, is press fitted with a pinion 31b. This pinion 31b is configured to engage with the gear portion 29c of the driving ring 29, and thereby the aperture stop motor 31 can rotationally drive the driving ring 29. As described above, the aperture stop motor 31 is electrically connected with the control unit of the image pickup apparatus through the flexible printed board. This configuration enables drive of the aperture stop motor 31 by a desired rotation amount.

Rotation of the driving ring 29 about the optical axis relative to the aperture stop base plate 27 moves the rotation boss 27a and the driving pin 29b relatively to each other, and thereby a distance between the rotation boss 27a and the driving pin 29b is changed. In the stop blade 26, the rotation hole 26a engages with the rotation boss 27a, and the cam hole 26b engages with the driving pin 29b. Thus, position of the driving pin 29b, therefore rotational position of the driving ring 29, can uniquely set a protruding amount of the stop blade 26 inside the aperture 28b. For example, the cam hole 26b in this embodiment has a cam locus to change the diameter of the aperture formed by the six stop blades 26 by one step per every predetermined rotation angle of the driving ring 29. With this configuration, a step drive amount of the aperture stop motor 31 is proportional to a change amount of an Av (aperture) value of the aperture stop unit 24.

The aperture stop unit 24 is attached to the second lens holder 22 disposed behind (closer to the image plane than) the aperture stop unit 24. Reference numeral 22a denotes paired positioning protrusions extending from the second lens holder 22 in the optical axis direction. Reference numeral 27c denotes paired engagement holes that are provided to the aperture stop base plate 27 and that engage with the positioning protrusions 22a. Engagement between the positioning protrusions 22a and the engagement holes 27c positions the aperture stop unit 24 relative to the aperture stop base plate 27 in the direction orthogonal to the optical axis. It is desirable that the aperture stop unit 24 and the second lens unit 21 be arranged as concentrically as possible in order to prevent degradation of optical performance. Thus, the positioning protrusions 22a are required to extend in the optical axis direction. After the positioning, the screws 25 are fastened to holes 22b formed in the second lens holder 22 through through-holes 27e formed in the aperture stop base plate 27, and thereby the aperture stop unit 24 is fixed to the aperture stop base plate 27. The screws 25 are fastened parallel to the optical axis so as not to shift the aperture stop unit 24 in the direction orthogonal to the optical axis due to their fastening.

As described above, since the holes and bosses (except the cam followers 23) of the aperture stop base plate 27 in this embodiment have parallel shapes to the optical axis, the aperture stop base plate 27 can be manufactured by uniaxial molding in the optical axis direction. That is, a mold used for the molding of the aperture stop base plate 27 can be manufactured by uniaxial working, and using a so-called slide mold is unnecessary for the molding. Thus, manufacturing difficulty of the aperture stop base plate 27 in this embodiment is not different from that of a general aperture stop base plate. Moreover, assembly of the aperture stop unit 24 involves mounting of components and screws only in one direction (optical axis direction), which maintains ease of the assembly. Since the aperture stop base plate 27 can be manufactured by uniaxial working, arrangement of the attachment face 27d is not restricted by the rotation bosses 27a, and an installation position of the aperture stop motor 31 is not so restricted.

As described above, the embodiment provides the lens barrel including the light quantity control apparatus capable of controlling a light quantity reaching the image pickup surface by the curved surface-shaped blade members such as stop blades or shutter blades rotatable about an axis that is not parallel to the optical axis. The embodiment is characterized in that the rotation bosses, which are provided in the aperture stop base plate 27 and which each engage with the hole of each blade member providing the rotation center axis of the blade member, extends in the optical axis direction, and in that a sectional shape of each rotation boss in the direction orthogonal to the optical axis is a shape based on the projected shape of the hole projected in the optical axis direction. In other words, the aperture stop base plate 27 is provided with the rotation bosses each extending in the optical axis direction and each having, as a sectional shape, an elliptical shape obtained by projecting in the optical axis direction the circular hole of the blade member which provides the rotation center of the blade member. Using such a rotation boss can achieve, regardless of the rotation boss extending in the optical axis direction, the same engagement state as that when a rotation boss tilting with respect to the optical axis is provided. Furthermore, using such a rotation boss enables manufacturing the aperture stop base plate without increasing its manufacturing difficulty and without decreasing its design flexibility, and thereby manufacturing of the light quantity control apparatus including the aperture stop base plate can be facilitated.

Although this embodiment described a so-called iris aperture stop unit in which the six stop blades are moved together to form one aperture, the number of the stop blades may be one or more. Although this embodiment also described as one example, the aperture stop unit (aperture stop apparatus) including the multiple stop blades, alternative embodiments of the invention may be a shutter apparatus including multiple shutter blades in place of the stop blades. Although this embodiment described the rotation bosses 27a of the aperture stop base plate 27 that are parallel to the optical axis, the rotation bosses 27a may not be parallel to the optical axis as long as they are parallel to each other. For example, if part of the rotation bosses 27a (for example, two rotation bosses 27a) extend in the same direction, the number of slide molds can be reduced as compared to those conventionally needed, and a resulting simplified mold structure can facilitate the manufacturing of the light quantity control apparatus. This embodiment can facilitate the manufacturing of the light quantity control apparatus including the curved surface-shaped blade members.

(Other Embodiments)

Figure 10:
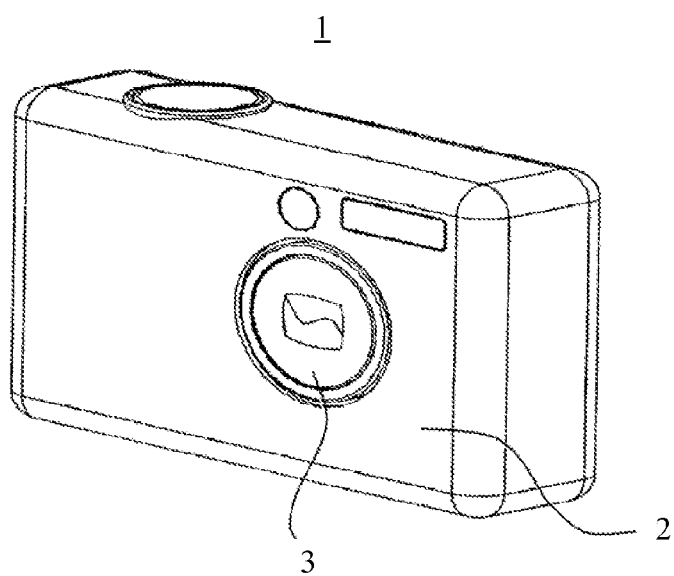
FIG. 10 is a perspective view illustrating an image pickup apparatus including the optical apparatus of the embodiment.

FIG. 10 is a perspective diagram illustrating a camera (image pickup apparatus) 1 including a lens barrel as an optical apparatus. As illustrated in FIG. 10, the camera 1 includes a camera housing 2 and the lens barrel 3. The lens barrel 3 is one described in the embodiment and is a retractable lens barrel that protrudes from a front of the camera housing 2 in the image taking state and retracts in the camera housing 2 in the retracted state. This camera 1 includes, in the camera housing 2, various component members (not illustrated) such as a magnification-varying mechanism, an aperture stop mechanism and a focus mechanism.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-208932, filed Oct. 4, 2013, which is hereby incorporated by reference herein in its entirety.

What is claimed is:

1. A light quantity control apparatus comprising:
   multiple blade members each including a first curved surface-shaped portion and a hole portion; and a member including multiple protrusion portions each inserted into the hole portion of one of the blade members, wherein:

the member includes a second curved surface-shaped portion shaped along the first curved surface-shaped portion of each of the blade members, the protrusion portions extend from the second curved surface-shaped portion, and the protrusion portions extend in parallel with each other, each extending in a direction different from a normal direction of the second curved surface-shaped portion.

2. A light quantity control apparatus according to claim 1, wherein:

the member includes an aperture through which a light flux passes, and the protrusion portions extend in a direction parallel to a direction in which the light flux passes.

3. A light quantity control apparatus according to claim 1, wherein:

the hole portion of the blade member has a circular shape which provides a rotation center axis of that blade member, and each of the protrusion portions has, in a sectional direction orthogonal to an extending direction in which the protrusion portion extends, a sectional shape corresponding to a projected shape of the hole portion of the blade member in the extending direction.

4. A light quantity control apparatus according to claim 3, wherein the sectional shape is an elliptical shape.

5. A light quantity control apparatus according to claim 4, wherein a length of a major axis of the elliptical shape is equal to a diameter of the hole portion.

6. A light quantity control apparatus according to claim 5, wherein, when A represents an angle formed by an axis extending through a center of the hole portion in a normal direction in which a normal to a curved surface of the second curved surface-shaped portion extends with respect to the extending direction, a length of a minor axis of the elliptical shape is shorter than a length obtained by subtracting, from a length obtained by multiplying the length of the major axis by cosA, a length obtained by multiplying a thickness of the blade member by sinA.

7. A light quantity control apparatus according to claim 1, wherein the blade members are stop blades.

8. A light quantity control apparatus according to claim 1, wherein the blade members are shutter blades.

9. A light quantity control apparatus according to claim 1, wherein:

the hole portion is provided in the first curved surface-shaped portion, and the hole portion has an elliptical shape when viewed from a direction in which the protrusion portions extend.

10. An optical apparatus comprising:

multiple blade members each including a first curved surface-shaped portion and a hole portion; and a member including multiple protrusion portions each inserted into the hole portion of one of the blade members, wherein:

the member includes a second curved surface-shaped portion shaped along the first curved surface-shaped portion of each of the blade members, the protrusion portions extend from the second curved surface-shaped portion, and the protrusion portions extend in parallel with each other, each extending in a direction different from a normal direction of the second curved surface-shaped portion.

11. An optical apparatus according to claim 10, wherein:

the member includes an aperture through which a light flux passes, and the protrusion portions extend in a direction parallel to a direction in which the light flux passes.

12. An optical apparatus according to claim 10, wherein:

the hole portion of the blade member has a circular shape which provides a rotation center axis of that blade member, and each of the protrusion portions has, in a sectional direction orthogonal to an extending direction in which the protrusion portion extends, a sectional shape corresponding to a projected shape of the hole portion of the blade member in the extending direction.

13. An optical apparatus according to claim 12, wherein the sectional shape is an elliptical shape.

14. An optical apparatus according to claim 13, wherein a length of a major axis of the elliptical shape is equal to a diameter of the hole portion.

15. An optical apparatus according to claim 14, wherein, when A represents an angle formed by an axis extending through a center of the hole portion in a normal direction in which a normal to a curved surface of the second curved surface-shaped portion extends with respect to the extending direction, a length of a minor axis of the elliptical shape is shorter than a length obtained by subtracting, from a length obtained by multiplying the length of the major axis by cosA, a length obtained by multiplying a thickness of the blade member by sinA.

16. An optical apparatus according to claim 10, wherein the blade members are stop blades.

17. An optical apparatus according to claim 10, wherein the blade members are shutter blades.

18. An optical apparatus according to claim 10, wherein:

the hole portion is provided in the first curved surface-shaped portion, and the hole portion has an elliptical shape when viewed from a direction in which the protrusion portions extend.

19. An image pickup apparatus comprising:

an image sensor; and an optical apparatus, wherein the optical apparatus comprises:

multiple blade members each including a first curved surface-shaped portion and a hole portion; and a member including multiple protrusion portions each inserted into the hole portion of one of the blade members, wherein:

the member includes a second curved surface-shaped portion shaped along the first curved surface-shaped portion of each of the blade members, the protrusion portions extend from the second curved surface-shaped portion, and the protrusion portions extend in parallel with each other, each extending in a direction different from a normal direction of the second curved surface-shaped portion.

* * * * *